United States Patent
Jain et al.

(10) Patent No.: US 9,501,570 B2
(45) Date of Patent: Nov. 22, 2016

(54) DYNAMIC ROUTING SYSTEM

(71) Applicant: Verizon Patent and Licensing Inc., Arlington, VA (US)

(72) Inventors: Abhishek Jain, Tampa, FL (US); Brian D. Ross, Little Rock, AR (US); Anand K. Rai, Congers, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 156 days.

(21) Appl. No.: 14/330,483

(22) Filed: Jul. 14, 2014

(65) Prior Publication Data

US 2016/0014009 A1   Jan. 14, 2016

(51) Int. Cl.
 G06F 15/173   (2006.01)
 *G06F 17/30*   (2006.01)
 *H04L 12/24*   (2006.01)

(52) U.S. Cl.
 CPC ..... *G06F 17/30864* (2013.01); *H04L 41/5038* (2013.01)

(58) Field of Classification Search
 CPC .................... H04L 43/50; G06F 17/30864
 See application file for complete search history.

(56) References Cited

U.S. PATENT DOCUMENTS

| | | | |
|---|---|---|---|
| 2003/0105809 A1* | 6/2003 | Yoshii | H04L 29/06027 709/203 |
| 2005/0102298 A1* | 5/2005 | Kawaguchi | G11B 27/034 |
| 2008/0031151 A1* | 2/2008 | Williams | H04L 12/2697 370/252 |
| 2011/0143782 A1* | 6/2011 | Dowlatkhah | H04W 4/00 455/456.5 |
| 2011/0153667 A1* | 6/2011 | Parmenter | G06F 17/30371 707/780 |
| 2012/0030368 A1* | 2/2012 | John | G06F 17/214 709/231 |
| 2014/0082139 A1* | 3/2014 | Shimomoto | G06F 3/1204 709/217 |
| 2015/0163131 A1* | 6/2015 | Bauer | H04L 45/44 709/223 |

* cited by examiner

*Primary Examiner* — Sargon Nano
*Assistant Examiner* — Tania Pena-Santana

(57) ABSTRACT

A computing system may comprise a processor and a memory having a routing program, the processor being configured to receive a first request having a data record with a unique subscriber identifier, extract the unique subscriber identifier from the first request, and compare a tag of a database table with the unique subscriber identifier. If the tag does not match the unique subscriber identifier, the processor may be configured to process the first request as part of a general test environment. If the tag matches the unique subscriber identifier, the processor may be configured to route the first request to a live test environment associated with the tag.

18 Claims, 5 Drawing Sheets

General Request
Process 200a

Live Request
Process 200b

DYNAMIC ROUTING SYSTEM

BACKGROUND

Traditional networks require an exclusive connection between a request originating system and a test environment. Test feeds may relate to a variety of activities including, for example, requests for addition, modification, or removal of service for a subscriber of a subscriber network. The test environment may include one or more general test environments for pre-production projects (e.g., projects that are in preliminary development or prior to being tested as part of a real subscriber network) that are configured to perform testing using software emulated network elements and, in addition, one or more live test environments for production projects (e.g., projects that are beyond preliminary development or after being tested as part of a real subscriber network) that are configured to perform testing using live network elements of a real subscriber network having subscriber data of subscribers. The request originating system, typically remote from the test environments, may generate and route requests—some requests associated with production projects being designated for the live test environment and others associated with pre-production projects being suitable or designated for the general test environment. Traditionally, the routing of requests was performed by the request originating system by manually performing messaging queue configuration changes. For instance, if a requestor designated that a live project needed to be tested against the live test environment, an entire test feed of requests including live and general projects must be manually re-pointed or diverted by the request originating system to a designated live test environment using messaging queue configuration changes by the request originating system.

With limited ability to distinguish between live projects and general projects by the request collection system, entire test feeds of requests are presently sent by the request collection system to the general or live test environment, thereby eliminating control as to which requests were designated for the live versus general test environments and resulting in failures for general projects inappropriately sent to the live test environment. For example, a general request incorrectly routed to the live test environment may result in a test failure or failure to implement intended changes on the subscriber network. Alternatively, a live request incorrectly routed to the general environment may result in a particular subscriber being billed for services without receiving access to the service. Thus, it may be desirable to provide dynamic routing of individual requests allowing requests to be processed and routed based on a unique subscriber identifier (USI) associated with each request, thereby providing flexibility to the routing of requests.

DETAILED DESCRIPTION

An exemplary routing system may utilize a routing network and a computing system to route requests from one or more requestors based on a comparison between a unique subscriber identifier (USI) as part of each request and an predefined data table. Based on the USI, a computing system (e.g., having the database table) may route a request to a general test environment (e.g., utilizing emulation software to simulate network elements) or a live test environment (e.g., utilizing network components associated with subscribers). Thus, the system may be configured to dynamically route requests between general and live test environments.

Figure 1:
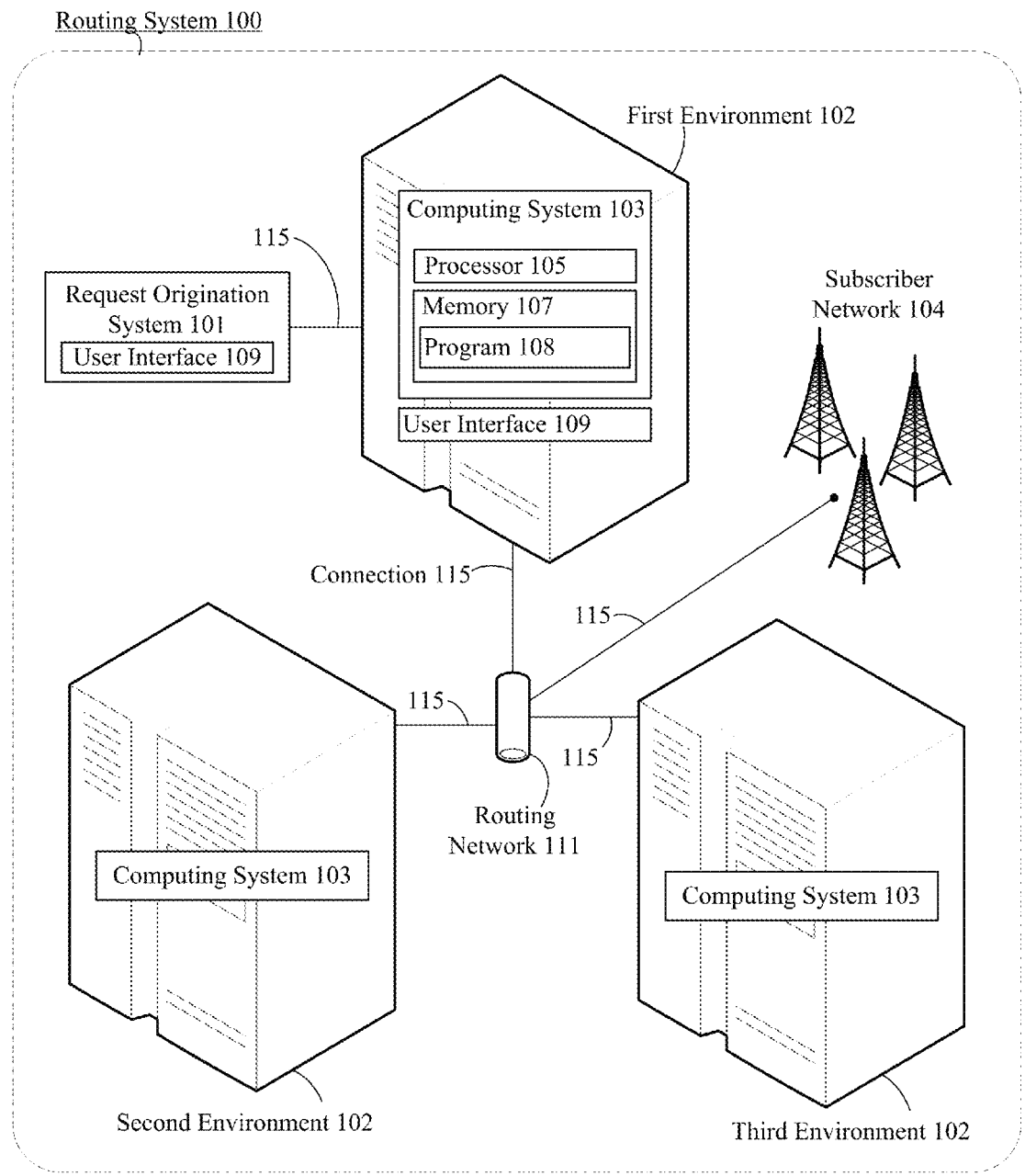
FIG. 1 illustrates an exemplary routing system for routing of requests to test environments.

FIG. 1 illustrates an exemplary system 100 having a request origination system 101, one or more environments 102 (e.g., first, second, and third environments 102), a subscriber network 104, and a routing network 111, which may be communicatively connected by connections 115. The environments 102 may include a computing system 103. The computing system 103 may include a processor 105 and a memory 107. The memory 107 may include a program 108. The request origination system 101 and the environment 102 (e.g., first environment 102) may further include a user interface 109. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

Referring to FIG. 1, the request origination system 101 may be any device or group of devices configured to receive a request from a requestor and send the request to an environment 102 referred to as a receiving environment 102 (e.g., the first environment 102). For pre-production requests, the requestor may include a network developer. For production requests, the requestor may include a network developer (e.g., a party that develops or maintains any software, hardware, or any network element of a subscriber network) and/or an existing or future subscriber (e.g., a party that uses or intends to use devices as part of a subscriber network) and the request may be to add, remove, or modify service to test a pre-production service or to implement and test a production service for a subscriber of the subscriber network 104. The request origination system 101 may be configured to receive a request from a requestor (e.g., a network developer or a subscriber) to change a communication service with respect to the subscriber network 104. If the request is designated by the requestor (e.g., network developer) for a live environment, the request may be sent to the subscriber network 104, for example to add, modify, or remove a service of a subscriber with respect to subscriber network 104. If the request is designated by the requestor for a general environment, the emulation software as part of the general environment 102 (e.g., first environment 102) may simulate the request being sent to the subscriber network 104 without affecting the service of the subscriber to the subscriber network 104. The requestor may designate, as described below, a general or live environment 102 based on whether the request is to affect access of a subscriber to the subscriber network 104. Thus, in response to receiving a request from the request origination system 101, an environment 102 that receives the request (e.g., first environment 102) may process the request as part of the environment 102 (e.g., first environment 102) or may route the request to another environment 102 (e.g., second or third environment 102).

The request origination system 101 may be connected to first environment 102, which may be communicatively connected to routing network 111. The routing network 111 may be communicatively connected to the environments 102 (e.g., first, second, and third environment 102). As an example, the first environment 102 may be configured for general testing and the second and third environments 102 may be configured for live testing. Although the first environment 102 may referred to herein as a general test environment or associated with general testing and the second and third environments may be referred to as live test environments or may be associated with live testing for purposes of providing examples, any of the environments 102 may be configured to perform general testing, live testing, or a combination thereof.

The requestor may designate a general or live environment 102 associated with a request, which may determine the routing of the request. As mentioned above, the test environment may be designated based on its desired function with respect to subscribers. If the desired function of the request is to test the functionality of a pre-production service prior to use by subscribers, a general test environment may be utilized to emulate network components, for example, without provisioning (e.g., adding, removing, or modifying) a service of a subscriber with respect to subscriber network 104. For example, a general environment 102 (e.g., first environment 102) may utilize emulation software to simulate a subscriber network while being isolated from subscribers. Alternatively, if the desired function of the request is to provision (e.g., add, remove, or modify) a production service with respect to a subscriber, a live environment 102 may be utilized to provision (e.g., add, remove, or modify) a production service and test network components that affect one or more services of the subscriber with respect to the subscriber network 104. Thus, the system may route requests based on the function desired and designated by the requestor.

More specifically, the request origination system 101 may send a request to an environment 102 (e.g., first environment 102) to add, modify, or remove service with respect to a particular subscriber, which may be referred to herein as a provisioning request. In this case, the receiving environment 102 may process the request if that environment 102 is designated for the request or if another environment 102 is not designated. Alternatively, if another environment 102 (e.g., second or third environment 102) is designated for the request, the receiving environment 102 (e.g., first environment 102) may route the request to the designated environment 102 (e.g., second or third environment 102). Thus, environments 102 may process or route requests based on an environment 102 designated by the requestor.

The request may change access of a subscriber to the subscriber network 104 by adding, modifying, or removing access to the subscriber network 104. An exemplary request may include a user initiated or automated request. The request may be configured in a markup language format (e.g., XML) and may be configured to be routed by program code of an application user interface (API). The request may be configured to grant, change, or revoke services of the subscriber with respect to subscriber network 104. For granting or adding access, a request may initiate operations such as activating a communication service of a subscriber. With respect to modifying access, a request may change a communication service of a subscriber. A request for removing or revoking access may deactivate a communication service of a subscriber, for example a requested account cancellation. Thus, environment 102 may receive the request from the request origination system 101, process or appropriately route the request to a designated environment 102, and if a live environment is designated, provision services of subscriber network 104.

The subscriber network 104 may be configured to provide communications services to a plurality of subscriber devices associated with subscribers. The subscriber network 104 may provide communications services, such as packet-switched network services (e.g., Internet access, VoIP (Voice over Internet Protocol) communication services) and location services (e.g., device positioning), to devices connected to the subscriber network 104. Exemplary subscriber network 104 may include a VoIP network, a VoLTE (Voice over LTE) network, a cellular telephone network, a fiber optic network, and a cable television network, as some non-limiting examples. Subscriber devices on the subscriber network 104 may be associated with subscriber information of the subscriber. The subscriber information may be used to uniquely identify the corresponding devices or subscribers. The subscriber information may include various types of information sufficient to identify a subscriber or a subscriber device over the subscriber network 104, such as mobile identification numbers (MINs), mobile telephone numbers (MTN), common language location identifier (CLLI) codes, Internet protocol (IP) addresses, and universal resource identifiers (URIs), as some non-limiting examples.

The request may include a data record having any number of data fields including the above-listed subscriber information, a request source, a request type, a subscriber device type, and one or more features of the request. The request source may be configured to receive the request from the requestor and may include a call center, a billing department, a point of service or retail store, or a service provider website. The request source may further include an API console, a billing application, a customer care application, or a wholesale application. The request type may indicate the functions to be performed by the request, for example indicating an addition, modification, or removal of access to subscriber network 104, which may be referred to herein as provisioning of service. The subscriber device type may include the type of device utilized by the subscriber, which may be provided to the request source by the requestor (e.g., a subscriber).

The features as part of a request may indicate one or more network elements to be tested. The network elements may be any device or software of subscriber network 104. Network elements may include a database of authorized subscribers such as a home location register (HLR), a specific network such as Nokia Solutions and Networks (NSN), a device activation program such as SIMOTA, a service authentication, authorization, and accounting (AAA) program, a short message service (SMS), a picture or multimedia messaging service (MMS), and a ringback tone (RBT) service. The network elements may further include a network switch (e.g., 3G or 4G switch), voicemail, cloud storage, lost/stolen management, prepaid services, emails services, mobile wallet, global positioning system (GPS) service, picture caller ID, and usage control. The network elements may include any other device or service associated with the subscriber network 104.

The computing system 103 may be communicatively connected with subscriber network 104 and environments 102 with routing network 111 using connections 115. Environments 102 may be representative of multiple computing systems working collectively to manage, test, and store data associated with requests. As described in further detail below, routing network 111 may provide the physical and logical connections to carry data along connections 115. The exemplary computing system 103 may be any computing system and/or device, which includes a processor and a memory (e.g., processor 105 and memory 107 described below), that enables the program 108 to route requests between environments 102.

The exemplary computing system 103 may take many different forms and include multiple and/or alternate components and facilities. For instance, the computing system 103 may be separate from or actually integrated into any of environments 102. Further, in some examples, the computing system 103 elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions, as described in further detail below.

The processor 105 may be any processor or microprocessor that receives instructions from a memory (e.g., memory 107 described below) and executes these instructions, thereby performing one or more processes, including one or more of the processes described herein. Such instructions and other data may be stored and transmitted using a variety of computer-readable media. The processor 105 may also include processes comprised from any hardware, software, or combination of hardware or software that carries out instructions of a computer programs by performing logical and arithmetical calculations, such as adding or subtracting two or more numbers, comparing numbers, or jumping to a different part of the instructions. The processor 105 may be any one of, but not limited to single, dual, triple, or quad core processors (on one single chip), graphics processing units, visual processing units, and virtual processors. In addition, a processor 105 is illustrated in each of the computing systems of FIG. 1 (e.g., computing system 103 and environments 102).

The memory 107 may be any computer-readable medium (also referred to as a processor-readable medium) that may include any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include optical or magnetic disks and other persistent memory. Volatile media may include dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. In addition, a memory 107 is illustrated in each of the computing systems of FIG. 1 (e.g., computing system 103 and environments 102).

The program 108 may be software stored in the memory 107 of the computing system 103 and executed by the processor 105 of the computing system 103. When the program 108 is executed by the processor 105, the processor 105 is caused to perform one or more of the processes described herein. In operation, the program 108 may be configured to cause the processor 105 to connect, via routing network 111, with environments 102 and route requests to and between environments 102.

The program 108 may also coordinate the routing of requests. For example, the program 108 may route requests based in part on a comparison between a USI as part of the request and a tag associated with a designated database, as described in more detail below. Alternatively or additionally, the program 108 may route requests based in part on program code defined by a user interface 109, for example an application programming interface (API).

For example, the program 108 may route requests based on a comparison between a USI as part of a data record of a request and a tag as part of a database table of an environment 102. The program 108 may match, e.g., a USI as part of a request and a tag of the database, to manage the routing of a request to a designated environment 102. A data record may include a number of data fields associated with the request, for example, a USI. A database table may include any number of tags associated with a designated environment 102, which may include one or more particular data fields chosen as identifiers from a database model. A database model may be defined by the database table as part of an environment 102 (e.g., first environment 102) listing the characteristics of each data field for the database scheme. The data fields of the data record and the database table are the containers that store information particular to a request or an environment 102, respectively. Thus, based on a particular set of data fields defining a tag associated with a designated environment 102, the requests may be routed by program 108 by comparing or matching the USI with one or more tags to route the requests according to information in the particular set of data fields associated with the matching tag.

In this example, the program 108 (e.g., using processor 105) may be configured to perform database lookup to determine one or more tags associated with a designated environment 102 and compare the tags to the USI's of the request. If a match is found, the program 108 may then process or route the request based the designated environment 102 having tags matching the USI. If no match is found, the program 108 may process the request on the environment 102 that received the request.

Tags may generally be chosen by the requestor (e.g., a network developer) from the data fields of the database table based on a data field's ability to uniquely identify a record. The tags of the database table may be designated using the program 108, as described in more detail below. The program 108 may specify at least one tag for each environment 102. The computing system 103 along with program 108 may be used to route requests, based on a matching tag and USI, as described above.

In response to receiving a request by the first environment 102 from the request origination system 101, the computing system 103 of the receiving environment 102 (e.g., first environment 102) may perform a database lookup of a database table as part of the first environment 102. The computing system 103 (e.g., using processor 105) as part of the receiving environment 102 (e.g., first environment 102) may compare the tags as part of the database table with the data record as part of the request. If computing system 103 finds a USI that matches a tag associated with a designated environment 102, the computing system 103 will process or route the request according to the designated environment. If the USI is not associated with a tag associated with a particular environment 102, the request may be processed as part of the first environment 102. If the USI is associated with a tag of a particular environment 102 (e.g., the second or third environment), the request is forwarded to the designated environment 102. Thus, program 108 may be configured to route requests to any of the environments 102 based on a match between the USI and one or more tags, thereby providing enhanced control over which requests are processed in a general versus live test environments or which live environment of a plurality of live environments 102.

An exemplary Data Record 1 as part of a database table is shown below.

Database Table 1:

| Record Name | Data Type | Data Value |
|---|---|---|
| USI | NUMBER(10) | unique subscriber identifier |
| ENVIRONMENT | VARCHAR2(16) | designated environment |
| REMARKS | VARCHAR2(4000) | optional comments |

The exemplary Database Table 1 includes a number of data fields having parameters associated with the exemplary database table. Database Table 1 may include any number of columns and rows, for example, to specify record names, data types, and data values. The record names may include USI, environment, and remarks. The data type may specify a data type including an associated data size. For example, NUMBER(10) designates a number having up to or equal to ten bytes and VARCHAR2(16) and VARCHAR2(4000) designate character strings having up to or equal to 16 and 4000 bytes, respectively. The data value may include any alphanumeric characters associated with the record name and in accordance with the data type, for example, including a USI, a designated environment 102, and optional comments related to the request. In addition, database tables may include any additional or alternative record names, data types, and data values.

Further, the program 108 may be configured to cause the processor 105 to generate and operate a messaging queue as part of each environment 102. The messaging queue is a destination for all data to be routed including, for example, requests received and sent by environments 102. Environments 102 may each include a messaging queue. Environments 102 may include an incoming messaging queue to handle incoming data and an outgoing messaging queue to handle outgoing data. For example, the first environment 102 may include an incoming messaging queue for requests from the request origination system 101. The second environment 102 may include a second messaging queue and third environment 102 may include a third messaging queue. Each messaging queue may be configured to keep data (e.g., requests) in order, for example based on the order in which it is received (e.g., a first-in-first-out order). The messaging queue may include a messaging queue configuration, for example, to allow for changes in the routing of requests. Using the messaging queue, the program 108 may then cause the processor 105 to manage the routing of requests to each environment 102.

The program 108 may be configured to route requests using hardware and/or software components external to the program 108. For instance, the program 108 may be configured to communicate directly with other applications, modules, models, devices, systems, and other sources through both physical and virtual interfaces. The program 108 may include program code and specifications for routines, data structures, object classes, and variables that receive, package, present, and transfer data through a connection or over a network, as described below.

As mentioned above, the program 108 may alternatively or additionally route requests based on program code as defined by a user interface 109 such as, for instance, an application programming interface (API). The program 108 may also be configured to generate and manage user interface 109, for example, to control and manipulate the program 108 based on a received input, e.g., program code. That is, the program 108 may include program code configured to generate, present, and provide one or more user interfaces 109 (e.g., in a menu, icon, tabular, map, or datagrid format) in connection with other modules for presenting information (e.g., data, notifications, instructions, etc.) and receiving inputs (e.g., configuration adjustments).

The user interface 109 described herein may be provided as software that when executed by the processor 105 present and receive the information described herein. The user interfaces 109 may include local, terminal, web-based, and mobile interfaces and any similar interface that presents and provides information relative to the program 108. The user interfaces 109 may also be provided as hardware or firmware, or combinations of software, hardware and/or firmware. The user interface 109 may include an application programming interface (API) configured receive program code that defines the routing of requests with respect to environments 102.

For example, the user interface 109 as part of computing system 103 may be configured to receive program code, using the program 108, to define the routing of requests. As mentioned above, the user interface 109 may include an application programming interface (API). The program code (e.g., received by the user interface 109) may define the routing of requests to respective designated environments 102. The user interface 109 may be configured to receive the exemplary Program Code 1 below.

Program Code 1:

```
select environment into l_ environment from
    USI_ENVIRONMENT_MAP where usi=usi_p;
IF NO_DATA_FOUND
THEN
    Process request in current environment
END IF;
IF l_environment = 'ENVIRONMENT1'
THEN
    Forward request to ENVIRONMENT1 environment
ELSE IF l_environment = 'ENVIRONMENT2'
THEN
    Forward request to ENVIRONMENT2 environment
ELSE IF l_environment = 'ENVIRONMENT3'
THEN
    Forward request to ENVIRONMENT3 environment
END IF;
```

Exemplary Program Code 1 above defines the routing of requests based on a designated environment 102 specified by the program code. As shown in exemplary Program Code 1, if no data is found in this data field, the request is processed in the current environment, for example first environment 102. If "environment1" is specified as part of the request, the request is forwarded to the first environment 102 or, if the request is already part of the first environment 102, remains as part of the first environment 102. If "environment2" is specified as part of the request, the request is forwarded to the second environment 102. If "environment3" is specified as part of the request, the request is forwarded to the third environment 102. Thus, the program 108 may utilize program code to route requests.

The user interface 109 may also include a display, support user interfaces, and/or any device configured to communicate data between a user and any portion of system 100. The user interface 109 may be configured to set or change messaging queue configuration settings, as described below. A display may include any input-output device for the receipt (e.g., to any portion of system 100) and presentation (e.g., from any portion of system 100) of information in visual or tactile form, such as user interfaces or web portals. Examples of display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, touch display, and the like. Thus, the display may present user interfaces or a web portal to a user, such that the user may interact with and receive information from other devices of system 100.

The program 108 may be provided as software that when executed by the processor 105 provides the operations described herein. Alternatively, the program 108 may be provided as hardware or firmware, or combinations of software, hardware and/or firmware. Additionally, although one example of the modularization of the program 108 is illustrated and described, it should be understood that the operations thereof may be provided by fewer, greater, or differently named modules.

The routing network 111 may be a collection of computers and other hardware to provide infrastructure to establish virtual connections and carry communications. That is, the routing network 111 may be configured to provide an infrastructure that generally includes edge, distribution, and core devices and provides a path for the exchange of information between different devices and systems. The routing network 111 may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications between the computing system 103 and environments 102 via connections 115.

The connections 115 may be wired or wireless connections (e.g., transmission media including coaxial cables, copper wire, fiber optics, and the like) between two endpoints (devices, systems, or networks) that carry electrical signals that facilitate virtual connections. Virtual connections are comprised of the protocol infrastructure that enables communication to and from the program 108 and environments 102. Although the routing network 111 and connections 115 of FIG. 1 illustrate the computing system 103 and the environments as directly connected, other combinations of hardware and software may be used to connect these devices. Thus, any portion of system 100 may be located within a single environment or in separate locations such that the computing system 103 may be located in a self-contained, sub-network of any environment 102, which may be connected to the other environments 102 via routing network 111 (e.g., as a backbone network).

In general, computing systems and/or devices, such as the request origination system 101 and the computing system 103, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the request origination system 101 and the computing system 103 generally include computer-executable instructions such as the instructions of the program 108, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein (e.g., environments 102) may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2A:
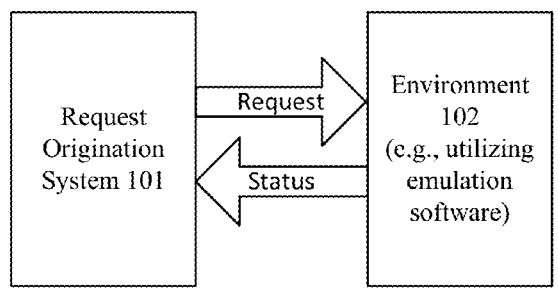
FIGS. 2*a*-*b* illustrate exemplary general and live request processes.
Figure 2B:
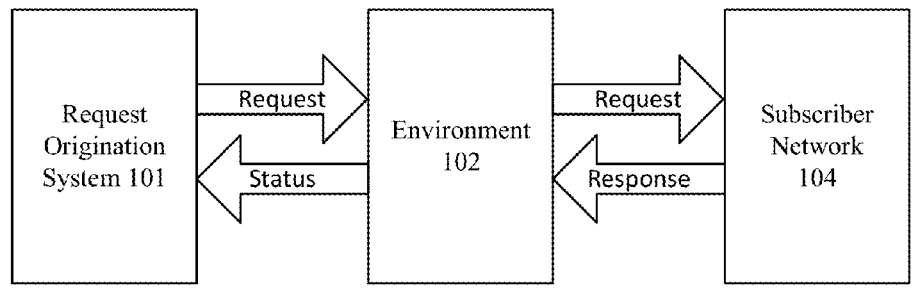

FIGS. 2a-b illustrate an exemplary general request process 200a and live request process 200b. The processes 200 may take many different forms and include multiple and/or alternate components and facilities. While exemplary processes 200 is shown in FIGS. 2a-b, the exemplary components illustrated in FIGS. 2a-b are not intended to be limiting. Indeed, additional or alternative components and/or implementations may be used.

Referring to FIGS. 2a-b, the general request process 200a illustrates an exemplary process for general testing of requests and the live request process 200b illustrates an exemplary process for live testing of requests. As shown, the general request process 200a may not send a particular request to the subscriber network 104, as it may utilize emulation software to process a particular request with respect to simulated network components. Alternatively, the live request process 200b may send a particular request to the subscriber network 104 to process the request with respect to network components affecting subscribers.

A general test environment may be configured for general testing of requests. See FIG. 2a. The request origination system 101 may send a request to the environment 102. The first environment 102 may include emulation software configured to execute the request and simulate the response of network components. The response may indicate a success or failure of the request. The first environment 102 may then send a status indicating the success (e.g., indicating that a service was activated, modified, or removed) or failure (e.g., indicating that a service was not activated, modified, or removed) to the request origination system 101.

Exemplary general testing may be configured to test transition requests associated with pre-production products including communication services and subscriber devices prior to use by subscribers of the subscriber network. Exemplary general testing may be configured to test requests associated with pre-production products including communication services and subscriber devices prior to being used by subscribers as part of the subscriber network.

A live test environment may be configured for live testing of requests with respect to subscriber network 104. See FIG. 2b. The request origination system 101 may receive a request from a requestor, for example, to add, modify, or remove service of a particular subscriber. The request origination system 101 may send the request to the second or third environment 102 as shown (e.g., using a messaging queue configuration) or to the first environment for subsequent routing to the second or third environment (e.g., using the USI as part of the request to route the request). The second or third environment 102 may send the request to subscriber network 104, which provisions the request. The subscriber network 104 may then send a response to the second or third environment indicating the success or failure of the request. In response to receiving the information from the subscriber network 104, the second or third environment may send a status notification indicating success or failure of the request to the request origination system 101 and/or the first environment 102.

Exemplary live testing may be configured to test transition requests associated with production products including communication services and subscriber devices being using by subscribers of the subscriber network. Exemplary live testing may be also configured to measure connectivity with respect to a provisioning of service. For example, the live testing may include a measurement of connectivity to confirm activation (e.g., addition of a subscriber), modification of subscriber features (e.g., changes in calling and data plans of a subscriber), or deactivations (e.g., removal of a subscriber) with respect to subscriber network 104.

In addition, the general and live testing may also be configured to measure a quality of service. The testing may include a quality measurement including, for example, a measurement of network throughput, delay, latency, jitter, bandwidth, transfer speed, and packet loss with respect to subscriber network 104. For example, after receiving a delayed response, no response, or a response indicating a failure (e.g., that the service was not activated, modified, or deactivated) from the network 104, the environment 102 may be configured to measure the quality of the network connection and include this measurement as a part of the status to the request origination system 101, for example, to assist in identifying a source of the failure. As a further example, after receiving a response indicating a success (e.g., that the service was activated, modified, or deactivated), the environment 102 may send the status to the request origination system 101 without a quality measurement, for example, to reduce the processing time of or resources utilized by the first environment 102.

Figure 3A:
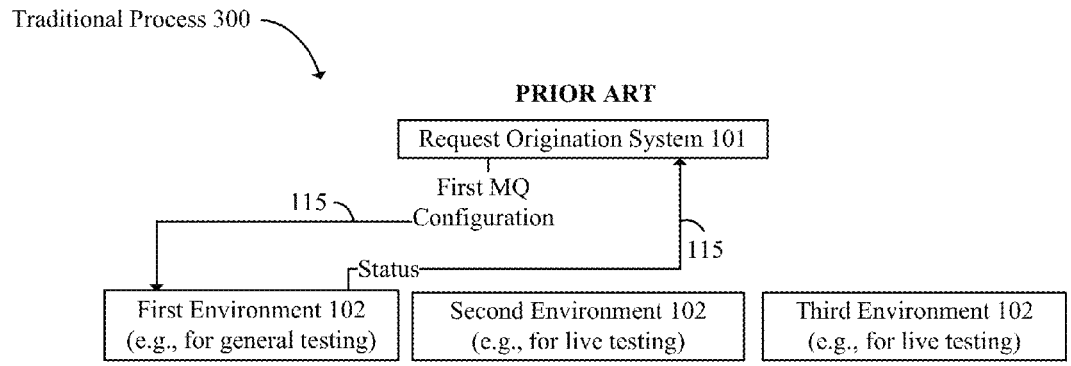
FIGS. 3*a*-*c* illustrate an exemplary traditional process of the routing system.
Figure 3B:
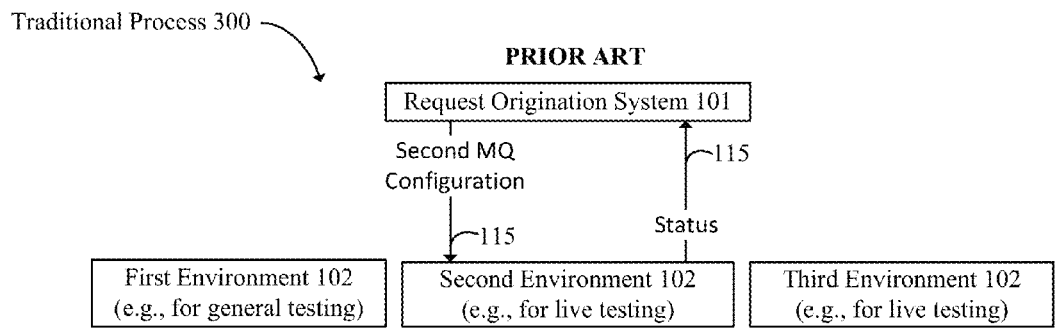
Figure 3C:
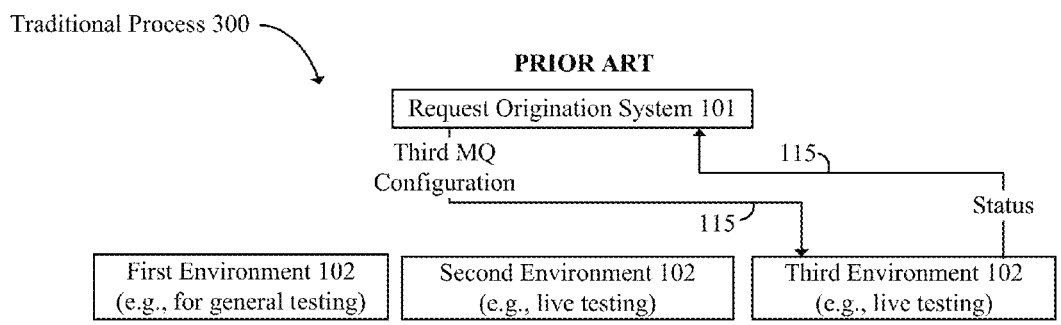

FIGS. 3a-c illustrate a traditional process 300 for routing requests between general and live test environments, for example, by changing messaging queue configuration settings as part of request origination system 101. The process 300 may take many different forms and include multiple and/or alternate components and facilities. While an exemplary process 300 is shown in FIGS. 3a-c, the exemplary components illustrated in FIGS. 3a-c are not intended to be limiting. Indeed, additional or alternative components and/or implementations may be used.

Referring to FIGS. 3a-c, the traditional process 300 may be configured to route requests based on messaging queue (MQ) configuration for the messaging queue as part of the request origination system 101. The request origination system 101 may be configured to receive a request from a requestor. Based on a test environment specified as part of the request and designated by the request origination system 101 in a messaging queue configuration of the request origination system 101, the request origination system 101 establishes a connection 115 that is exclusive to a single environment 102. The request origination system 101 may be configured to route requests to one of environments 102 based on the messaging queue configuration settings of a messaging queue as part of the origination system 101. Based on the messaging queue configuration, the request origination system 101 may establish a connection 115 (e.g., a dedicated connection) to one of environments 102. Thus, the traditional process 300 requests rely on a messaging queue configuration designating the connection 115 to an individual environment 102.

The traditional process 300 may utilize manual routing of request based on messaging queue configuration changes for the request origination system 101. If general testing is designated by the requestor for the request, a first messaging queue configuration may designate routing to an environment 102 configured for general testing, e.g., first environment 102. Alternatively, if live testing is designated by the requestor for the request, a second or third messaging queue configuration may designate routing to an environment 102 configured for live testing, e.g., second or third environment 102. Thus, the traditional process 300 may require a messaging queue configuration change for each testing environment designated by the requestor.

As shown in FIG. 3*a*, exemplary traditional process 300 may establish a connection 115 between the request origination system 101 and the first environment 102, for example, in response to an environment 102 specified by the requestor. Using a first messaging queue configuration as part of the request origination system 101, connection 115 may establish a test feed of requests between the request origination system 101 and the first environment 102, thereby routing all requests to the first environment 102. The first environment 102 may receive a response from the general testing and, in response, send a status indicating the response to the request origination system 101. Thus, with the first messaging queue configuration, all requests are routed to the first environment 102.

Referring to FIG. 3*b*, exemplary traditional process 300 may further be configured to route requests to the second environment 102 (e.g., for live testing). Traditional process 300 may implement a second messaging queue configuration, for example, to route the test feed of request to second environment 102. The second environment 102 may be configured for live testing, as described above. The second environment 102 may receive a response from the live testing and, in response, send a status indicating the response to the request origination system 101. Thus, with the second messaging queue configuration, the requests are routed to the second environment 102.

With reference of FIG. 3*c*, exemplary traditional process 300 may be configured to route requests to the third environment 102 (e.g., for live testing). Traditional process 300 may implement a third messaging queue configuration, for example, to route the test feed to the third environment 102. The third environment 102 may be configured for live testing, as described above. The third environment 102 may receive a response from the live testing and, in response, send a status indicating the response to the request origination system 101. Thus, with the third messaging queue configuration, the requests are routed to the third environment 102.

Figure 4:
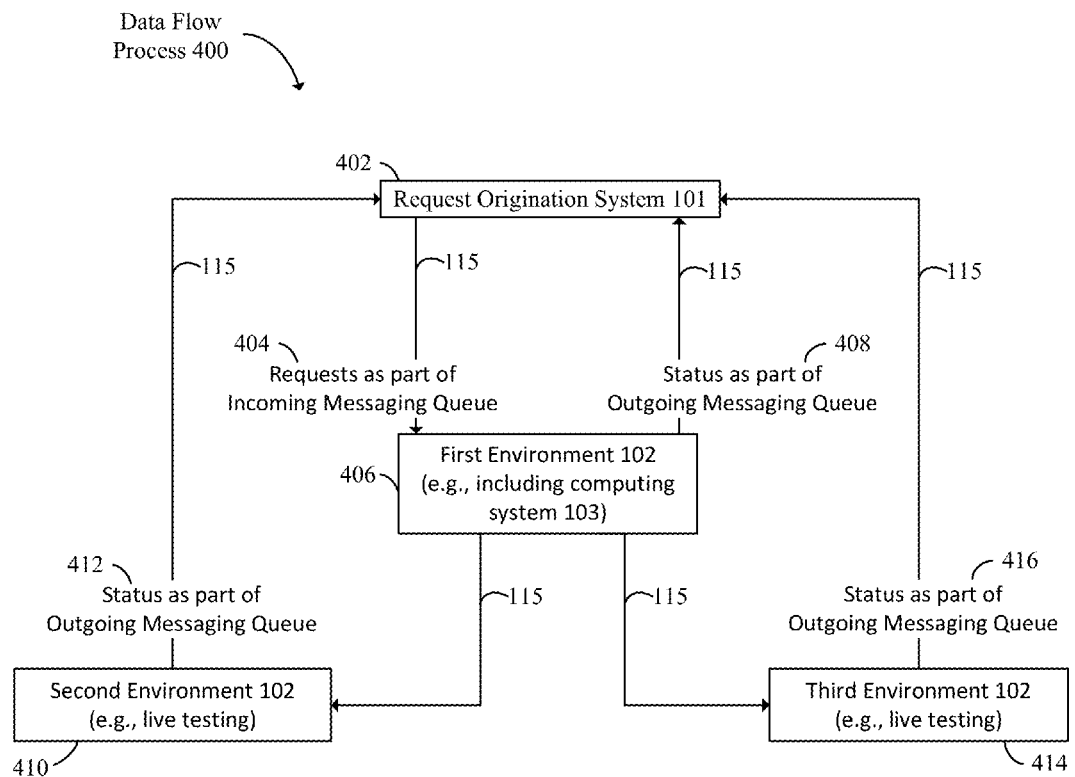
FIG. 4 illustrates an exemplary data flow process of the routing system.

FIG. 4 illustrates an exemplary data flow process 400 executed by program 108 for routing requests between general and live test environments, for example, according to a USI as part of a data record of a request. Exemplary process 400 may take many different forms and include multiple and/or alternate components and facilities. While an exemplary process 400 is shown in FIG. 4, the exemplary components illustrated in FIG. 4 are not intended to be limiting. Indeed, additional or alternative components and/or implementations may be used.

At block 402, the program 108 may receive a request from a requestor. The request origination system 101 may route the request to an incoming messaging queue as part of the first environment 102. As mentioned above, the request origination system 101 may be remote from environments 102 and may rely on messaging queue configuration changes to route requests. Instead of relying on messaging queue configuration changes for the request origination system 101, the request origination system 101 may be configured to route requests to the first environment 102, which may handle the processing or routing of requests. For example, the first environment 102 may access the tags of the database table as part of the first environment and route the requests according to the program code of program 108, as described above.

At block 404, the request is received as part of the incoming messaging queue of the first environment 102. The incoming messaging queue may order and process the requests on a first-in-first out basis.

At block 406, the first environment 102 compares the tags of the database table with the data record. If no field of the data record matches a tag of the database table, the request is processed as part of the first environment 102, which performs live testing and receives a response (e.g., from the emulation software) having an indication of success or failure with respect to the request. If a field matches a tag, the request is processed by the environment 102 designated by the database table, which may be any of the first, second, or third environment 102.

At block 408, the outgoing messaging queue, as part of the first environment 102, orders and sends a status indicating the response (e.g., from the emulation software) to the request origination system 101. The outgoing messaging queue may order the routing of requests, for example, on a first-in-first-out basis.

At block 410, the request is received by the second environment 102. The second environment 102 performs live testing and receives a response having an indication of success or failure from the subscriber network 104, as described above.

At block 412, the outgoing messaging queue, as part of the second environment 102, orders and sends a status indicating the response to the request origination system 101.

At block 414, the request is received by the third environment 102. The third environment 102 performs live testing and receives a response having an indication of success or failure from the subscriber network 104, as described above.

At block 416, the outgoing messaging queue, as part of the third environment 102, orders and sends a status indicating the response to the request origination system 101.

At block 418, the first environment 102 processes the responses from the general and live testing and generates a status indicating a success or failure of each request to the request origination system 101. The status may be sent to the outgoing messaging queue as part of the first environment 102. After block 418, the process ends.

Figure 5:
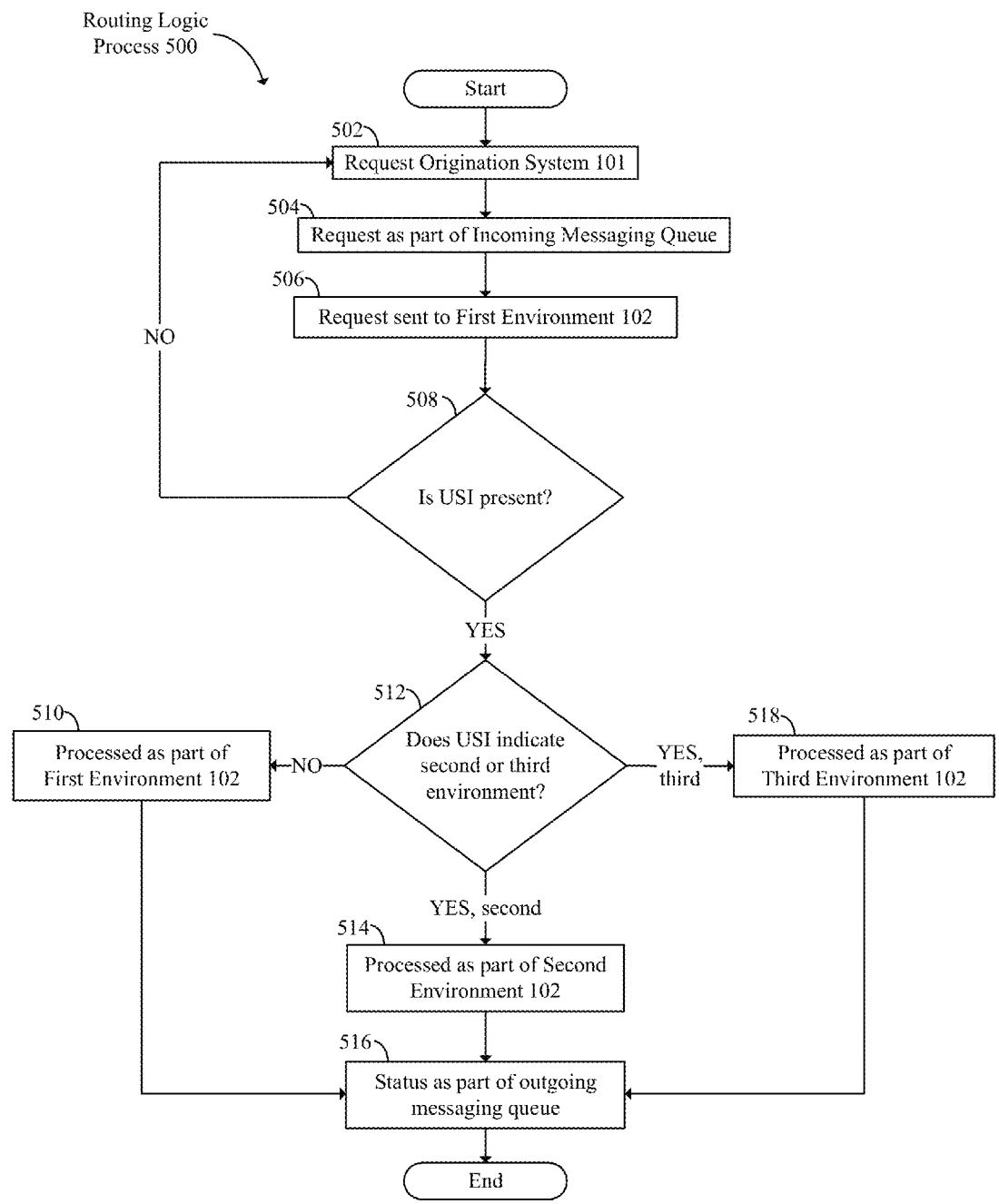
FIG. 5 illustrates an exemplary routing logic process for the routing system.

FIG. 5 illustrates an exemplary routing process 500 for routing requests to and between environments 102. Exemplary process 500 may take many different forms and include multiple and/or alternate components and facilities. While an exemplary process 500 is shown in FIG. 5, the exemplary components illustrated in FIG. 5 are not intended to be limiting. Indeed, additional or alternative components and/or implementations may be used.

At block 502, the request origination system 101 may generate a request to add, change, or remove access with respect to the subscriber network 104 and send the request to the incoming messaging queue as part of first environment 102.

At block 504, the computing system 103 receives the request. The first environment 102 may extract the USI and match the USI with a tag as part of the database table of the first environment 102, as described above. If the USI matches a tag associated with a designated environment, the first environment 102 may process or route with the request according to the designated environment 102. Then, the first messaging queue may send the request to be processed or routed by the first environment 102, as described above.

At block 506, the request may be received and ordered by the first messaging queue, for example, based on an order received by the first messaging queue.

At block 508, the request may be routed based on the USI. The computing system 103 may check the request for a USI and, if present, match the USI to a tag of the database table as part of the first environment 102. If the USI is not present or does not match a tag of the database table, the data record of the request may be populated with an error message indicating that the USI is not present and is resent to block 502, the request origination system 101. Alternatively, if the USI is not present or does not match a tag of the database table, the request may be processed as part of the first environment 102. If a USI matches a tag associated with the first, second, or third environment 102, the request may be processed as part of or routed to the designated environment 102.

At block 510, the request may be processed as part of the first environment 102.

At block 512, the request may be routed based on whether a USI in the data record of the request matches a tag associated with the second or third environment 102, as described above. If the USI matches a tag for the second environment 102, the request sent to the second environment 102. If the USI matches a tag for the third environment, the request is sent to the third environment 102.

At block 514, the request may be processed as part of the second environment 102.

At block 516, the request may be received and ordered by the outgoing messaging queue as part of the second environment 102, for example, to be routed to the request origination system 101, as described above.

At block 518, the request may be processed as part of the third environment 102. After block 518, the process 500 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing system comprising:
a processor and a memory having a routing program, the processor including a microprocessor and being configured to:
receive a first request having a data record;
in response to the data record of the first request having a unique subscriber identifier:
extract the unique subscriber identifier from the first request,
compare a tag of a database table with the unique subscriber identifier,
process the first request as part of a general test environment in response to the tag not matching the unique subscriber identifier, and
route the first request to a live test environment associated with the tag and provision a subscriber service with respect to a subscriber network in response to the tag matching the unique subscriber identifier,
wherein the first request is routed to the general test environment based in part on the unique subscriber identifier and, while maintaining a messaging queue configuration setting of a messaging queue, a second request is routed to the live test environment based in part on a second unique subscriber identifier; and
in response to the data record of the first request not having the unique subscriber identifier, process the request as part of the general test environment.

2. The system of claim 1, wherein the live test environment is specified as part of the tag and the request includes a provisioning request for an addition, removal, or modification of the subscriber service.

3. The system of claim 1, wherein a program code of a user interface defines the tag associated with at least one of the general test environment and the live test environment.

4. The system of claim 1, wherein at least one of the general test environment and the live test environment is specified in part by a data field of the data record.

5. The system of claim 1, further comprising the processor being configured to receive the first request and the second request with the messaging queue as part of the general test environment, the second request having a second data record with the second unique subscriber identifier.

6. The system of claim 1, further comprising the processor being configured to route the second request to at least another one of a general test environment and a live test environment associated with the second request based in part on the second unique subscriber identifier.

7. A non-transitory computer-readable medium tangibly embodying computer-executable instructions of a routing program, the routing program being executable by a processor including a microprocessor of a computing device to provide operations comprising:
receive a first request having a data record with a unique subscriber identifier;
extract the unique subscriber identifier from the first request;
compare a tag of a database table with the unique subscriber identifier;
route the first request to at least one of a general test environment and a live test environment associated with the first request based in part on the comparison between the unique subscriber identifier and the tag, wherein the first request is routed to the general test environment based in part on the unique subscriber identifier and, while maintaining a messaging queue configuration setting of a messaging queue, a second request is routed to the live test environment based in part on a second unique subscriber identifier; and
provision a subscriber service with respect to a subscriber network in response to the tag matching the unique subscriber identifier.

8. The medium of claim 7, wherein at least one of the general test environment and the live test environment is specified as part of the database table.

9. The medium of claim 7, wherein a program code of a user interface defines the tag associated with at least one of the general test environment and the live test environment.

10. The medium of claim 7, wherein at least one of the general test environment and the live test environment is specified in part by a data field of the data record.

11. The medium of claim 7, further comprising the processor being configured to receive the second request having a second data record with the second unique subscriber identifier.

12. The medium of claim 7, further comprising the processor being configured to route the second request to at least another one of a general test environment and a live test environment associated with the second request based in part on the second unique subscriber identifier.

13. A method comprising:
receiving a first request having a data record with a unique subscriber identifier;
extracting the unique subscriber identifier from the first request;
comparing a tag of a database table with the unique subscriber identifier;
routing the first request to at least one of a general test environment and a live test environment associated with the first request based in part on the comparison between the unique subscriber identifier and the tag, wherein the first request is routed to the general test environment based in part on the unique subscriber identifier and, while maintaining a messaging queue configuration setting of a messaging queue, a second request is routed to the live test environment based in part on a second unique subscriber identifier; and
provisioning a subscriber service with respect to a subscriber network in response to the tag matching the unique subscriber identifier.

14. The method of claim 13, further comprising: specifying at least one of the general test environment and the live test environment as part of the database table.

15. The method of claim 13, further comprising: defining, with program code of a user interface, an association between the tag and at least one of the general test environment and the live test environment.

16. The method of claim 13, further comprising: specifying at least one of the general test environment and the live test environment as part of a data field of the data record.

17. The method of claim 13, further comprising: receiving, using a microprocessor, the second request having a second data record with the second unique subscriber identifier.

18. The method of claim 13, further comprising: routing, using a microprocessor, the second request to at least another one of a general test environment and a live test environment associated with the second request based in part on the second unique subscriber identifier.

* * * * *